(12) United States Patent
Van Nimwegen et al.

(10) Patent No.: US 10,773,449 B2
(45) Date of Patent: Sep. 15, 2020

(54) WRAPPED OBJECT, MANDREL THEREFOR AND METHOD

(71) Applicant: COMPOSITE PRODUCTION TECHNOLOGY B.V., Wieringerwerf (NL)

(72) Inventors: Jordy Van Nimwegen, Beverwijk (NL); Casper Rudolph Johannes Willems, Amsterdam (NL)

(73) Assignee: Composite Production Technology B.V., Wieringerwerf (NL)

( * ) Notice: Subject to any disclaimer, the term of this patent is extended or adjusted under 35 U.S.C. 154(b) by 225 days.

(21) Appl. No.: 15/556,254

(22) PCT Filed: Mar. 9, 2016

(86) PCT No.: PCT/EP2016/055063
§ 371 (c)(1),
(2) Date: Sep. 6, 2017

(87) PCT Pub. No.: WO2016/142441
PCT Pub. Date: Sep. 15, 2016

(65) Prior Publication Data
US 2019/0111609 A1     Apr. 18, 2019

(30) Foreign Application Priority Data

Mar. 9, 2015   (EP) ..................................... 15158318

(51) Int. Cl.
*B29C 53/60*     (2006.01)
*B29C 53/82*     (2006.01)
(Continued)

(52) U.S. Cl.
CPC ........ *B29C 53/602* (2013.01); *B29C 44/1285* (2013.01); *B29C 53/822* (2013.01);
(Continued)

(58) Field of Classification Search
None
See application file for complete search history.

(56) References Cited

U.S. PATENT DOCUMENTS 3,210,228 A    10/1965   Bluck
3,266,660 A *   8/1966   Ragettli ............... B29C 53/602
                                                      206/521
(Continued)

FOREIGN PATENT DOCUMENTS

DE          1479811         4/1969
DE          9107320         10/1992
(Continued)

OTHER PUBLICATIONS

International Search Report dated Aug. 19, 2016 for corresponding International Application PCT/EP2016/055063 filed Mar. 9, 2016.
(Continued)

*Primary Examiner* — Jeffry H Aftergut
(74) *Attorney, Agent, or Firm* — Steven M. Koehler; Westman, Champlin & Koehler, P.A.

(57) ABSTRACT

A method of manufacturing a wrapped object, having a first segment and a second segment connected to each other by a curved transition segment having a common tangent with the first segment and a common tangent with the second segment, respectively. The method includes providing a mandrel with a surface structure to define at least part of the shape of the first segment, of the shape of the second segment and of the shape of the transition segment in between, and wrapping, one or more elongate elements over the mandrel and bonding the elongate element(s) to itself and/or each other so as to provide the first segment, the second segment and the transition segment as a continuous structure. The mandrel is provided with a fortification to support the element(s) forming the transition segment
(Continued)

against inward-directed forces while wrapping and/or bonding the element(s) to form the transition segment.

20 Claims, 6 Drawing Sheets

(51) Int. Cl.
*B29C 70/24* (2006.01)
*B29C 70/44* (2006.01)
*B29C 44/12* (2006.01)
*B29L 31/00* (2006.01)
*B29C 33/04* (2006.01)
*B29C 44/18* (2006.01)

(52) U.S. Cl.
CPC ............ *B29C 53/824* (2013.01); *B29C 70/24* (2013.01); *B29C 70/446* (2013.01); *B29C 33/04* (2013.01); *B29C 44/18* (2013.01); *B29C 53/605* (2013.01); *B29L 2031/7156* (2013.01)

(56) References Cited

U.S. PATENT DOCUMENTS

| | | |
|---|---|---|
| 3,449,182 A | 6/1969 | Wiltshire |
| 4,684,423 A | 8/1987 | Brooks |
| 5,499,739 A | 3/1996 | Greist, III et al. |
| 5,534,318 A | 7/1996 | Andre De, La Porte et al. |
| 5,763,035 A | 6/1998 | Andre De, La Porte et al. |
| 6,444,071 B1 | 9/2002 | Ayorinde |
| 2009/0071965 A1 | 3/2009 | Iida et al. |

FOREIGN PATENT DOCUMENTS

| | | |
|---|---|---|
| FR | 1215065 A | 4/1960 |
| FR | 2582570 A1 | 12/1986 |
| RU | 2039652 C1 | 7/1995 |

OTHER PUBLICATIONS

Written Opinion of the International Searching Authority dated Sep. 26, 2016 for corresponding International Application PCT/EP2016/055063, filed Mar. 9, 2016.

Russian Search Report and Written Opinion for Russian patent application No. 2017132591/05(057355), completed Jun. 27, 2019, with English translation.

Russian Office Action from the Patent Office of the Russian Federation for patent application No. 2017132591/05(057355), dated Jun. 27, 2019, with English translation.

European Result of Consultation dated Feb. 24, 2020, for corresponding European Patent Application No. 19709053.9, filed Mar. 9, 2016.

\* cited by examiner

WRAPPED OBJECT, MANDREL THEREFOR AND METHOD

CROSS-REFERENCE TO RELATED APPLICATION

The present application is a national stage of and claims priority of International patent application Serial No. PCT/EP2016/055063, filed Mar. 9, 2016, and published in English.

TECHNICAL FIELD

The present disclosure relates to wrapped objects, in particular wound and hollow objects such as tubular structures, closed structure, containers and in particular large tank containers e.g. for storage and/or transport of flowable materials in bulk quantities. More in particular the present disclosure relates to methods and mandrels for manufacturing such objects.

BACKGROUND

The present disclosure relates to the aforementioned wrapped objects and in particular the use of removable and re-useable mandrels for manufacturing such objects. The manufacture of such wrapped objects comprises arranging, e.g. winding, one or more elongate elements, such as fibers, multi-fiber filaments, yarns, tapes, and/or so-called prepregs over a mandrel and bonding the elongate elements together to form the wrapped object. The objects may be large-size pressure vessels and/or complex-shaped objects from composites.

Bulk containers and tanks made from composite, fiber reinforced materials present cost-effective alternatives for metal vessels and tanks, e.g. because of their comparatively lower weight transport costs may be reduced. Manufacture of robust but thin-walled hollow metal objects such as metal tanks, in particular steel tanks, also tends to be more complex and expensive than that of wound tanks.

For manufacturing efficiency and costs, as well as for reasons of mechanical properties such as strength and robustness, wrapped objects and in particular wound tanks should be made in a single winding operation, i.e., the object should not be composed of separate segments attached together but be made as one integral object.

Figure 1:
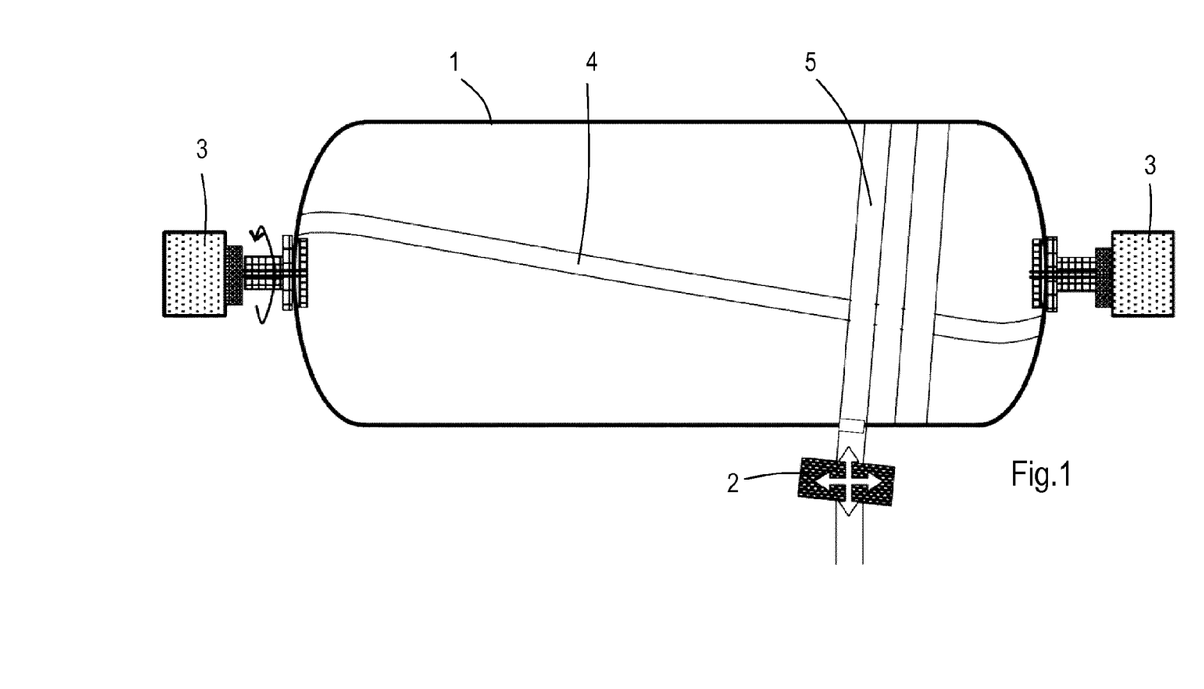
FIG. 1 indicates such manufacturing process for an elongated bulk tank vessel comprising a cylindrical segment and opposite dome-shaped end segments.

FIG. 1 indicates an exemplary stage in such manufacturing process for an elongated bulk tank vessel which comprises a cylindrical segment and dome-shaped end segments opposite each other. FIG. 1 shows a mandrel 1, a filament feeder, a rotary drive 3 for rotating the mandrel 1 with respect to the filament feeder, and first and second fiber bands 4 and 5, respectively. For manufacturing, the mandrel 1 is wound in filaments or tapes of pre-impregnated fibers. The fibers are applied in first bands 4 oriented generally in longitudinal direction of the tank, so-called "helicals", and in second bands 5 oriented generally in azimuthal direction relative to the longitudinal direction of the tank, so-called "hoops". Once the filaments or tapes are wound and bonded together a continuous and uninterrupted structure is formed around the mandrel, forming the tank wall, wherein the fibers or fiber bands are oriented in a desired way for withstanding forces of use of the tank.

In FIG. 1 the transition segments between the cylindrical segment and each end segment are filleted in accordance with force distribution in the end product and in accordance with an acceptable bending radius of the fibers during manufacture and use in the end product. Such transition segments may be considered joints between the adjacent segments and they are of particular concern hereafter.

The manufacturing processes requires a large number of process steps, thus being complex and expensive. Particular problems arise at the transition segments between the cylindrical segment and the end segments as set out below.

Manufacturing of a hollow object by wrapping e.g. a wound vessel over a mandrel produces a pressure force normal to the surface of the mandrel and directed inwards due to the tension on the fibers or tape at application. The pressure force increases with each layer of fibers added over the mandrel. The mandrel must withstand such pressure. In a foam mandrel the compression modulus and compression strength are generally decisive. In an inflatable mandrel the inflation pressure and possible deformation pressure are generally decisive.

The magnitude and direction of the force on any position on the mandrel surface are determined by the curvature of the surface: the stronger the curvature (i.e. the smaller the radius of curvature), the larger the local force. Thus, large forces may arise at a transition between two (curved) segments arranged at an angle to each other thus producing a bend section between the two curved segments over which fibers are wound at an angle to the direction of extension of the bend (i.e. a bending line) close to perpendicular. In vessels of the aforementioned type and shown in FIG. 1, this is the case for the "helicals" at the transition sections between the cylindrical segment and the domed end caps.

Figure 2A:
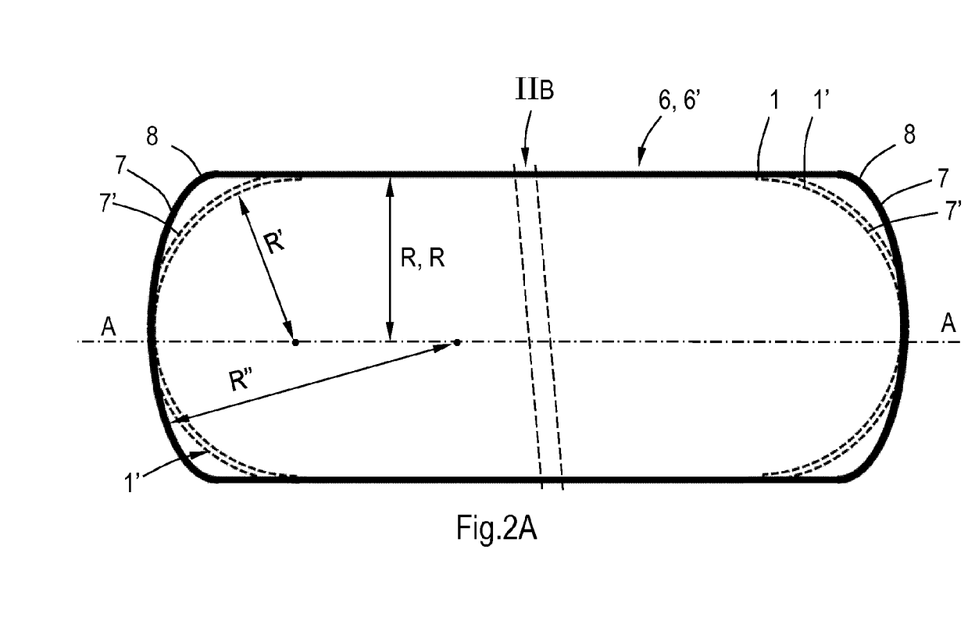
Figure 2B:
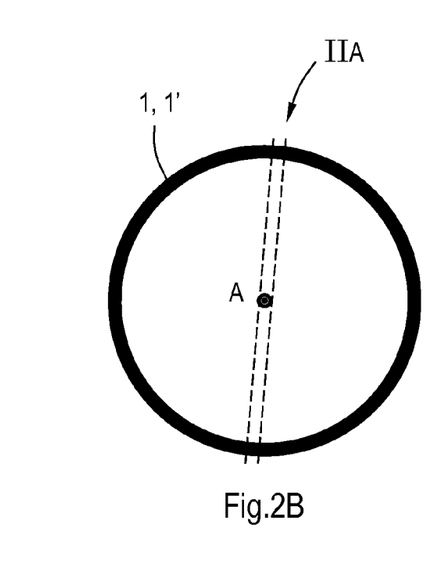
Figure 3:
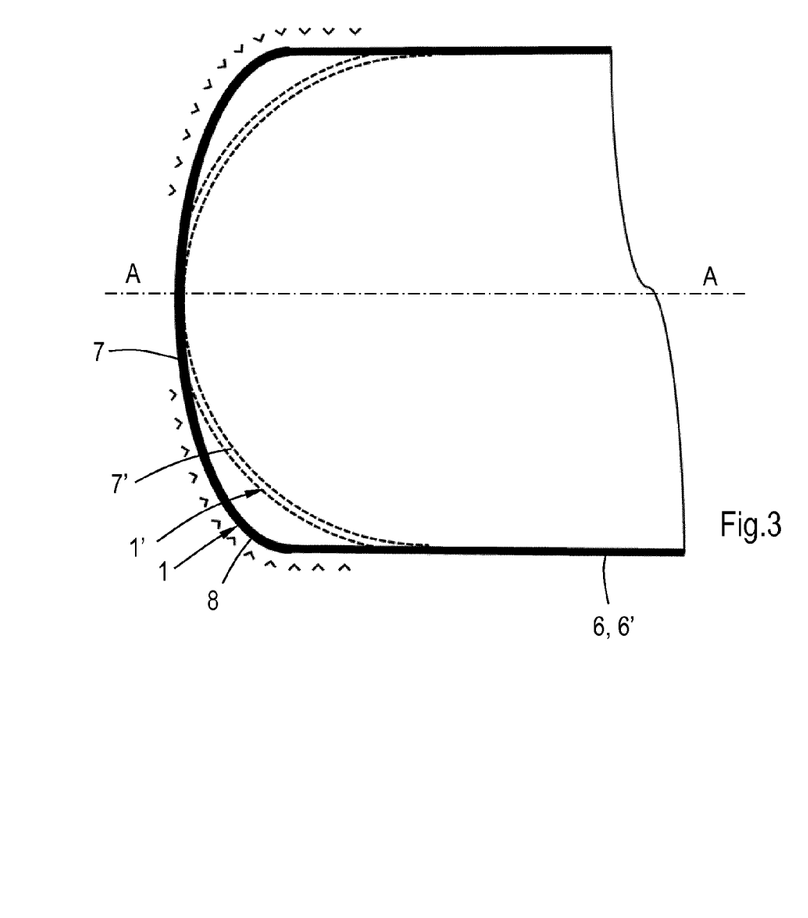

FIGS. 2A-3 indicate the effect of the radius of curvature at and near transition segments in different shapes of a wound tank over corresponding mandrels, indicated with 1 and drawn in full line and, respectively, indicated with 1' and drawn in dashed line respectively. In the following, similar elements and details of the respective mandrels will be indicated with similar symbols, where expedient identified with or without a prime.

The mandrels 1, 1' each are elongated along an axis A, A'. FIG. 2A is an axial longitudinal cross section view and FIG. 2B is a transverse cross section view as indicated in the respective Figs. with IIA and IIB, respectively. Note that in FIG. 2A the two different shapes under consideration are overlaid to show the differences; such differences are not visible in FIG. 2B. FIG. 3 is a detail of (the mandrels of) FIGS. 2A-2B The mandrels 1, 1' each comprise a cylindrical section 6, 6' and (outwardly) convex end sections 7, 7' so that the end segments of the formed tank would have a dome shape. The mandrel 1 further comprises a transition section 8 between the cylindrical section 6 and the respective end sections 7.

The cylindrical sections 6, 6' of each mandrel have a substantially circular shape with radius R=R' about the axis A (see FIG. 2B).

The end sections 7' of the mandrel 1' are hemispherical with a sphere radius R' corresponding to the circle radius R' of the cylindrical section 6'.

The end sections 7 of the mandrel 1 are flattened compared to a hemispherical shape, having a central portion which has a bending radius R" significantly larger than the circle radius R of the cylindrical section 6, here being about 2.5 times as large, but it may have any radius of curvature from about two times as large up to orders of magnitude larger for tanks with very flat domes. The transition sections 8 on the other hand form a fillet between the cylindrical section 6 and the respective end sections 7 with a radius of curvature significantly less than the circle radius R, which may vary over the transition sections 8. The transition sections 8 have a common tangent with the first segment and a common tangent with the second segment, respectively, which tangents extend in different directions within one plane, thus, the transition section 8 forms a smooth variation between the cylindrical section 6 and the respective end sections 7 with a continuously varying tangent over the curvature (e.g. no discontinuities in spatial first derivatives of the normal of a tangent plane to the surface from the cylindrical section 6 to the respective end sections 7 across the respective transition sections 8, the second spatial derivative of the tangent within the plane preferably being smooth and nonzero).

In an inflated inflatable mandrel, the end sections will want to balloon and take on a (hemi-) spherical shape, such as in mandrel 1'. In an inflatable mandrel designed for another shape, e.g. mandrel 1 with relatively flattened end sections 7, this will lead to a non-uniform pressure build-up in the mandrel when inflated, with relatively high outward pressure in on the end sections close to the axis A and less pressure or even under pressure in the transition sections 8. This is indicated with arrow heads in FIG. 3. This may even lead to deformation of (the transition sections 8 of) the mandrel 1 from the intended shape to another shape, e.g. with caved in transition sections 8. Thus an object wrapped over such mandrel will have sub-optimally defined and supported transition segments. This effect is aggravated under the force of the filaments (tapes, fibers, . . . ), in particular "helicals" wrapped around such mandrel for manufacturing a wrapped object.

The present disclosure addresses this issue.

Further, in bulk storage tanks, in particular for liquids and/or foodstuffs, improved control over storage parameters of the interior volume of the hollow object may be desired. That aspect is addressed as well in the present disclosure.

Also, in particular for large-volume transport containers, structural integrity and robustness of the object is very important and improvements are sought after. That aspect is addressed as well in the present disclosure.

SUMMARY

A method of manufacturing a wrapped object, in particular a hollow wound object is provided herewith. The object comprises a first segment, e.g. tubular segment and a second segment, e.g. an end segment connected to each other by a curved transition segment having a common tangent with the first segment and a common tangent with the second segment, respectively, e.g. a fillet joint. Thus, the first and second segments extend generally at a nonzero angle to each other. The method comprises the step of providing a mandrel with a surface structure to define at least part of the shape of the first segment, of the shape of the second segment and of the shape of the transition segment in between, e.g. corresponding to those shapes, and the step of wrapping one or more elongate elements, such as winding filaments and/or tapes, over the mandrel and bonding the one or more elongate elements to itself or each other so as to provide the first segment, the second segment and the transition segment as a continuous structure. The mandrel is provided with a fortification at least at the position of the transition segment, the fortification being configured to support the one or more elongate elements forming the transition segment against inward-directed forces, with respect to the direction of curvature of the transition segment, while wrapping and/or bonding the one or more elongate elements to form the respective segments.

Because of the fortification, the transition segment (or rather: the transition segment to be) may be reliably supported and deformation of the mandrel due to forces as a result of the winding and/or due to a relaxation tendency of a pressurized mandrel may be prevented and wrapped objects may be manufactured more accurately and in more sharply defined shapes. In particular, containers with flatter end segments may be provided, having increased storage volume of the container, compared to hemispherical end segments. Further, deformation of the mandrel may be prevented during winding of the object which may comprise significant forces in length direction of the elongated element(s). Thus the operation of wrapping may become more simple and structural integrity of the object may be increased, e.g. since delamination and/or break-up of layers due to mandrel deformation is reduced or prevented.

In an embodiment the object is a container, in particular tank container or a bulk container for a flowable material, comprising a tubular segment and wherein the tubular segment of the container may form a generally elongated body and end segments, e.g. domed endcaps, are provided on opposite ends of the tubular segment closing the tubular segment. Thus an integral container is formed having increased strength and reliability, and which may have larger volume to weight ratio than metal tanks of similar size and robustness.

In an embodiment the mandrel comprises an inflatable portion and/or a dissolvable portion, such as, respectively, an inflatable bladder, a dissolvable foam and/or a combination thereof. Such mandrels are relatively easily removable from the object, also when largely enclosed by it.

In an embodiment the fortification comprises one or more rigid bodies to support at least part of the transition segment, wherein plural rigid bodies may be interconnected with each other directly and/or via a supporting structure such as a deployment mechanism, and which one or more rigid bodies may become integrated into the manufactured object or which one or more rigid bodies may be removable from the manufactured object, e.g. for reuse. Rigid bodies may provide clear fortification. Interconnected rigid bodies may provide a substantially non-deformable whole, at least under forces occurring during manufacturing the object, in particular during winding and/or bonding. Connecting the bodies indirectly to each other such as via a deployment structure facilitates intended deformation of the fortification and removal of it from the object, also through relatively small openings in the object. Integrating one or more rigid bodies facilitates manufacture since the body need not be remover and it may lead to fortification of the object itself. Rigid bodies may be of metal, polymeric material, glass, etc., but a hard foam is also conceivable. The fortification may form a ring, possibly with circular outer circumferential shape, and/or a disc portion or a differently shaped portion for supporting the elongate elements.

In an embodiment the fortification comprises one or more pressurizable bodies, e.g. inflatable bodies, possibly inflatable chambers connected to another inflatable portion of the mandrel, e.g. as a separately inflatable chamber within a larger inflatable chamber. Inflatable or pressurizable mandrels enable control over the hardness of the mandrel. Pressurization may be done with a gas and/or a liquid. A liquid may improve temperature control of the mandrel and material in close contact with it. Different pressurizable bodies, in particular independently pressurizable bodies such as inflatable chambers enable accurate control over relative stiffness of the respective mandrel portions.

At least part of the object may be provided with a liner, which may be formed from one or more inflatable portions of an inflatable mandrel. Thus, any contents of the object may be separated from wall materials. A liner may also facilitate internal cleaning of the object.

In an embodiment the bonding is done with an adhesive or binder, e.g. wherein the one or more elongate elements comprise an inorganic or an organic fiber and/or tape which may be bonded together with a thermoplastic polymer composition and/or another suitable bonding agent. An adhesive may be applied to the mandrel and/or a previously wound layer on it so as to wind the filament or tape into the adhesive and/or the other way around. A binder may be applied to chemically react with a portion of the filament or tape. A thermoplastic polymer composition facilitates bonding by melting the polymer composition. A bonding agent may be curable by heat, electromagnetic irradiation (e.g. ultraviolet light) and/or other techniques.

In an embodiment the object is formed as a generally rigid and/or self-supporting body, e.g. a monocoque, and at least part of the mandrel may be deformed and removed from the rigid and/or self-supporting body through an opening provided in the object, and wherein the object may be a substantially closed shell. Thus, a self-supporting container may be produced efficiently. Part of the mandrel may be retained in the object, e.g. an inflatable bladder may form a liner to the object, in particular when the bladder and the wound material are suitably attached together.

In an aspect hereby is provided a method of manufacturing a wrapped object comprising a first segment and a second segment connected to each other by a curved transition segment having a common tangent with the first segment and a common tangent with the second segment, respectively, e.g. a fillet joint with the first and second segments extending generally at a nonzero angle to each other, in particular any embodiment of a method described herein, wherein the method comprises the step of providing one or more portions of a cellular material such as a foam or a 2-dimensional or 3-dimensional latticework, onto at least one of the tubular segment and the end segment, and the step of providing one or more further wall segments onto the one or more portions of a cellular material and separated from the first segment and the second segment respectively, thus providing the object with a double-walled construction with one or more intervening spaces between the first segment and/or the second segment and the one or more further wall segments and the one or more portions of a cellular material, respectively, and wherein the method further comprises filling the one or more intervening spaces with one or more further cellular materials such as foams. The cellular material and the further cellular material may be of the same material.

The materials of first, second and transitional segments, the cellular material and the further wall segments may be selected for different purposes and/or aspects of use. E.g. the further wall segments may form an outer cladding protecting the object against weather influences and/or comprising structures for mounting additional components to the object.

Thus, a double-walled object is formed wherein the intervening space between the segments and walls can be accurately determined by selection of an appropriate cellular material. Foam-filling provides increased structural integrity, thermal insulation and mechanical insulation. The method may enable relatively fast manufacturing. Compartmenting the foam by predetermined positioning of the cellular material improves control over manufacturing and can prevent propagation of defects through the foam and/or cellular material.

The mechanical and chemical properties of the respective materials and—portions should preferably be selected such that a mechanical and/or chemical connection between the respective elements is obtained which is stronger than the cohesive forces of the cellular materials. This provides a strong sandwich construction and prevents slippage of one of the elements (object, walls, cellular material, further cellular material) with respect to each other.

In an embodiment the cellular material comprises a honeycomb structure of tubular cells, wherein the tubular direction may be oriented parallel to the nearest wall segment or perpendicular thereto. Honeycomb materials are exceedingly robust and capable of absorbing large amounts of energy at comparably little weight and in well-determinable directions of relative higher and lower strengths. An embodiment further comprises that at least one of the first and second wall segments, and/or the one or more cellular materials and/or foam portions in at least a portion of an intervening space is bonded to the respective wall segments that are opposite each other and define that portion of the intervening space. For this, an adhesive may be used and/or an adhesive may be formed by at least one of the one or more cellular materials and/or foam portions in at least a portion of an intervening space, possibly by cooperation with another agent as a two-component adhesive. In such embodiment the opposite walls (e.g. inner and outer walls) of the double walled structure are interconnected well and the object becomes particularly strong and robust. The cellular material and/or foam may be highly capable of absorbing shocks and/or deformation forces such as stretching and compression forces, increasing stiffness of the complete structure, e.g. for situations of under pressure/vacuum, thereby increasing robustness and safety of a container thus constructed.

Note that herein, foams and other cellular material may be open pore materials or also be closed pore materials.

In an aspect hereby is provided a method of manufacturing a wrapped object comprising a first segment and a second segment connected to each other by a curved transition segment having a common tangent with the first segment and a common tangent with the second segment, respectively, e.g. a fillet joint between the first and second segments which extend generally at a nonzero angle to each other, in particular the method of any preceding claim, wherein the method comprises providing a heat exchanger in or in close thermal contact with at least one wall of the object, in particular at least one of the first segment and the second segment, wherein the heat exchanger may comprise a fiber plate structure and/or be integrated into at least one of the first segment and the second segment.

Thus, thermal control of the object and any substance in contact with it, e.g. a substance received in a container, can be improved. A fiber plate structure is a very effective way of realising a heat exchanger for integration with a polymeric wound wall segment with relatively little weight compared with, e.g., metal heat exchangers.

In an embodiment, the heat exchanger comprises a plate-like body having a channel for a heat exchanger fluid, the plate-like body conforming to at least one of the first segment and the second segment, wherein e.g. the plate-like body is accommodated in the mandrel and/or is part of the mandrel. A plate-like heat exchanger combines a large thermal exchange surface with a low volume, therewith not affecting the holding capacity of the object much, or not affecting significantly a structural and/or thermal insulation barrier in a sandwich construction.

The heat exchanger may be formed by deformation of a substantially hollow fiber plate or fiber mat, e.g. pressing together one or more portions thereof, and fixing the thus deformed fiber plate or—mat in the deformed state to define one or more fluid channels through the thus fixed fiber plate or—mat. E.g. the plate or mat may be impregnated at least partly with a hardening matrix material such as a resin, a polymeric material, a thermoplastic material, thermosetting material, which may be fixed with or without a curing agent, UV curing, evaporation of a solvent etc. It is also possible to fuse, e.g. solder, weld and/or melt portions of a fiber plate or—mat together to form the desired fluid channels.

In an aspect, a mandrel for use in the method described herein is provided. The mandrel may be a multi-part mandrel.

In an aspect, a hollow wound object manufactured as disclosed herein being a container is provided, in particular a tank container or a bulk container for a flowable material, comprising transport fixtures for transporting the object as a shipping container and/or as a lorry trailer, e.g. being provided with a mounting frame and/or one or more wheels. The container may have a volume of over several cubic meters and over, e.g. about 30 m^3 for a container of 7 m length and 2.4 m diameter with domed end segments, and up to about 100 m^3 for a so-called 40 ft. container, or 15 m long lorry trailers. Transport fixtures may comprise frames for stacking containers and/or wheels for rolling the container as a lorry or a train wagon.

BRIEF DESCRIPTION OF THE DRAWINGS

The above-described aspects will hereafter be more explained with further details and benefits with reference to the drawings showing a number of embodiments by way of example.

FIGS. 2A-3 indicate the effect of the radius of curvature of different shapes of a wound tank over corresponding mandrels.

DETAILED DESCRIPTION OF EMBODIMENTS

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with alphabetic suffixes.

Figure 4A:
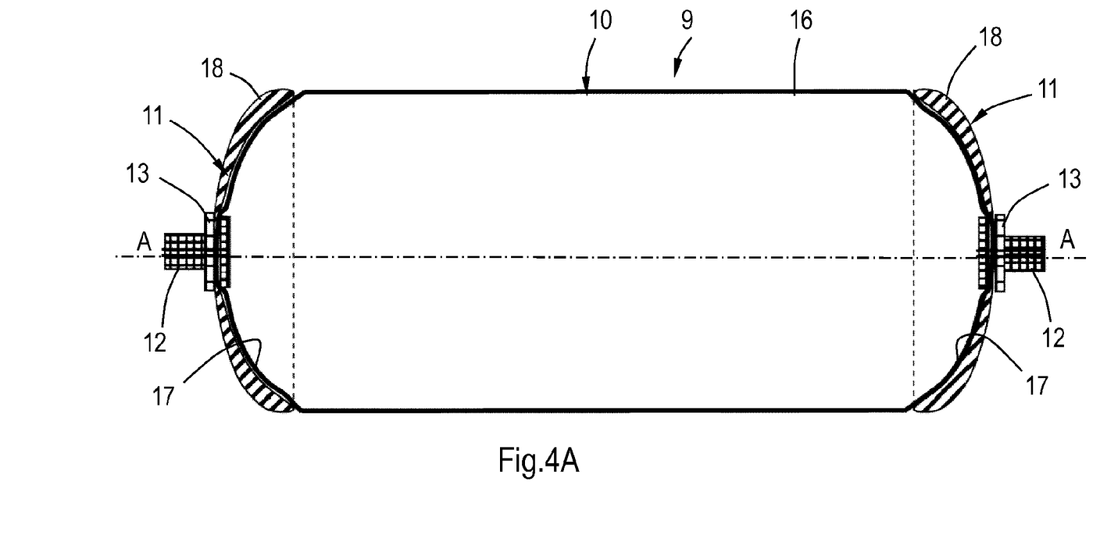
FIGS. 4A-4B indicates an embodiment of a mandrel with fortifications.
Figure 4B:
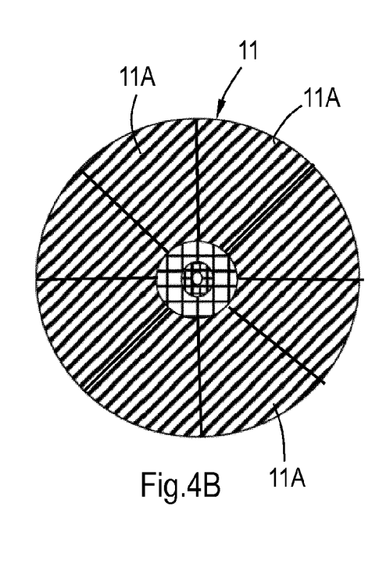

FIGS. 4A and 4B indicate a mandrel 9 in cross section view (FIG. 4A) and axial front view (FIG. 4B), respectively. The mandrel 9 has an inflatable bladder 10 and fortifications 11. The mandrel 9 is supported by and connected to a rotary drive (not shown) with connectors 12. Flange mountings 13 connect the bladder 10, the fortifications 11 and the connectors 12 together.

The inflatable bladder 10 comprises a first section in the form of an elongated cylindrical section 16, extending along an imaginary axis A, and second sections in the form of end sections 17 on opposite ends. Over the end sections 17 fortifications 11 are mounted and fixed. The shown fortifications 11 comprise rigid segments 11A, e.g. pie-shaped segments as indicated, together forming a convex disc structure. Suitable materials comprise metals, polymer composite with or without filler materials such as (glass) fibers, and foams with a high mechanical stiffness.

At least one of the connectors 12 and flange mount 13 comprises a connector to the bladder 10 for pressurizing the bladder 10. The pressure may be adjusted via a suitable pressurisation system and a measurement and control system (not shown). A hollow tank container may be manufactured by winding fibers or fiber-reinforced tape around the mandrel 9, over both the bladder 10 and the reinforcements 11. Possibly a liner is first provided over the mandrel 9 before winding. The wound material is bonded, e.g. with a resin, to provide a monocoque tank container.

The shape of the formed tank container will correspond to that of the mandrel 9 and be as generally indicated in FIG. 1: the cylindrical section 16 of the bladder 10 of the mandrel 9 will define the shape of the tubular segment of container (cf. FIG. 1). The shape of the disc-like fortifications 11 of the mandrel 9 will define the shape of the end segments of the container (cf. FIG. 1). The fortifications 11 define a rim 18 extending around the axis A which defines the shape of the transition segments of the container at that position. Since the fortifications 11 are rigid, they provide a resistance to a radial force components with respect to the mandrel axis A and thus can support the elongate members wrapped over the fortifications 11. The end sections 17 of the bladder 10 can be inflated against the fortifications 11 over an interaction surface area which here is larger than their cross sectional area considered in a direction perpendicular to the axis A. When inflated, the bladder 10 and fortifications 11 are formed such that the fortifications 11 are urged outward with respect to the bladder 10. Thus, the fortifications 11 can withstand a force with an axial component. In sum, winding forces on the rim 18 of the fortifications 11 can be withstood and the intended shape of the container, corresponding to the mandrel shape can be accurately provided. The fortifications 11 can extend over part of the tubular section to provide a suitably smooth transition between the tubular segment and the transition segment for the wrapping material without steps or marked edged in the mandrel surface that could affect the wrapping.

After setting of the bonding of the object and possible further manufacturing steps, the mandrel can be deflated and removed from the object through an opening provided in the object therein. E.g. an opening formed by the flange mount 13 may suffice, or a manhole cut into a wall of the container. The fortifications 11 may remain in place as part of the container. Alternatively, the fortifications 11 may be removed by disassembly into the segments 11A from the interior of the formed object and removal of the segments (not shown).

Figure 5A:
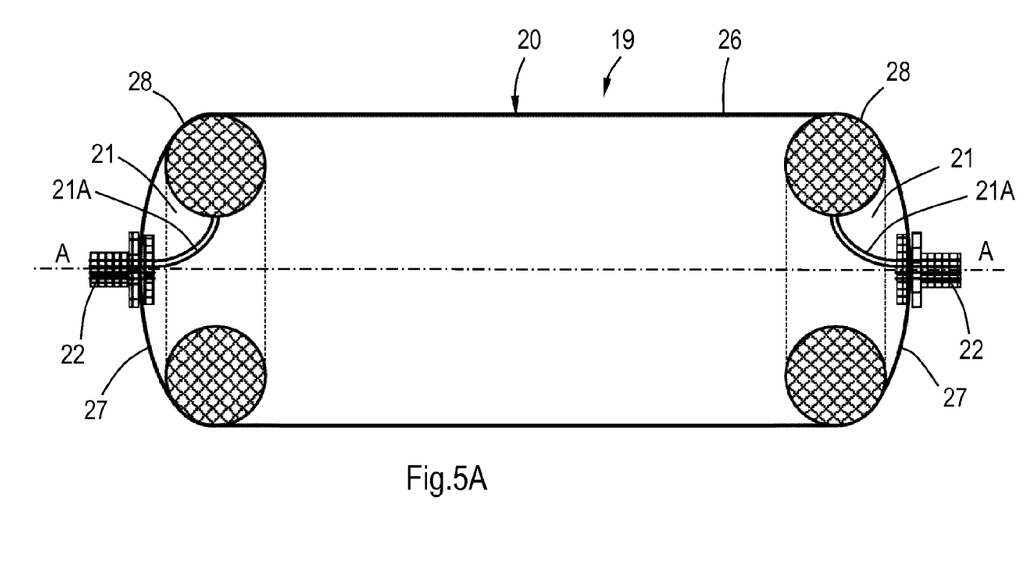
FIGS. 5A-5B indicates an embodiment of a mandrel with fortifications.
Figure 5B:
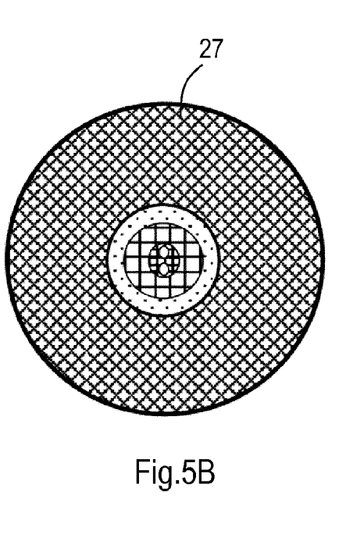

FIGS. 5A and 5B indicate another mandrel 19 in cross section view (FIG. 5A) and axial front view (FIG. 5B), respectively. The mandrel 19 has an inflatable bladder 20 and fortifications 21. The mandrel 19 is supported by and connected to a rotary drive (not shown) with connectors 22. Mountings 13 connect the bladder 20 and the connectors 12 together.

The inflatable bladder 20 comprises as a first section an elongated cylindrical section 26, extending along an imaginary axis A, and as second sections end sections 27 on opposite ends.

At least one of the connectors 22 and flange mount 23 comprises a connector to the bladder 20 for pressurizing the bladder 20. The pressure may be adjusted via a suitable pressurisation system and a measurement and control system (not shown). A hollow tank container may be manufactured by winding fibers or fiber-reinforced tape around the mandrel 19, over both the bladder 10 and the reinforcements 21. Possibly a liner is first provided over the mandrel 19 before winding. The wound material is bonded, e.g. with a resin, to provide a monocoque tank container.

Also in this embodiment, the shape of the formed tank container will correspond to that of the mandrel: the cylindrical section 26 of the bladder 20 of the mandrel 19 will define the shape of the tubular segment container (not shown). Here, the shapes of the end sections 27 of the mandrel 19 will define the shape of the end segments of the container (not shown), without intervening fortification disc.

In this embodiment, the reinforcements 21 are provided in the form of additional pressurizable chambers 21, toroidal extending around the axis A and in this case attached to the bladder 20. The additional inflatable chambers 21 are inflatable independently from the bladder 20 via conduits 21A connected with the flange mount 23. When inflated, in particular to a higher pressure than the rest of the mandrel 19, the inflatable chambers 21 provide both radial and axial force components in addition to those of the bladder 19 at the transition region 28 of the bladder between the cylindrical section 26 and the end sections 27 of the bladder 19. Thus, the inflatable chambers 21 serve as fortifications to the mandrel 19 with adjustable winding force resistance by a suitable pressure control system, (not shown). Therewith the shape of the mandrel 19 and consequently that of the object wound thereon can be accurately controlled and end caps 29 that are flatter than hemispherical domes can readily be provided, as shown; compare also FIGS. 2A-3.

Figure 6:
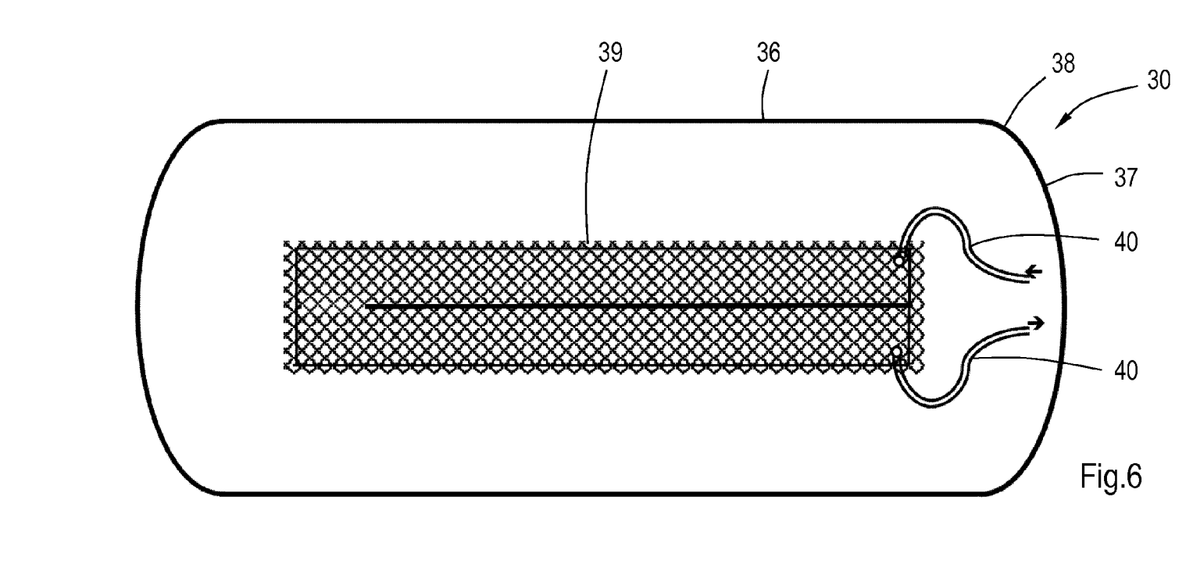
FIG. 6 indicates a container with a plate heat exchanger.

FIG. 6 indicates a wound object 30 as manufactured on a mandrel according to FIG. 4A-4B or 5A-5B by winding a filament and bonding the wound filament layers together. The object 30 is bulk tank container 30, e.g. of 45 m^3 comprising a tubular segment 36 and opposite end segments 37 connected to each other generally at a nonzero angle by transition segment 38 forming fillet joints. The end segments 37 may be generally ellipsoidal with a radius of curvature of more than twice the cylinder radius of the tubular segment 36, although other shapes are equally conceivable. The end segments 37 are closed at the positions of the connectors 12, 13/22, 23 by suitable means such as flanges (not shown). One or more holes may be provided into the container possibly provided with corresponding lids.

The container 30 comprises a heat exchanger 39 attached to a wall of the container 30. The heat exchanger 39 is plate like and conforms to the curved wall shape of the tubular segment 36 of the container 30. The heat exchanger 39 has been fixed to the wall by bonding to the filaments while winding the container; this may be facilitated by mechanical and/or chemical similarities in the materials of the wall and the heat exchanger. A suitable temperature control fluid, e.g. a coolant or a hot fluid can be fed through the heat exchanger 39 by means of conduits 40 connected to a cooling or heating system (not shown). The heat exchanger may be mounted on exterior side of the container or on an interior side. In a double-walled container the intervening space between the double walls may be preferred.

Suitable material and manufacturing techniques for such heat exchanger are known. One example is a 3-dimensionally woven glass fiber structure, e.g. the material sold under the trade name Parabeam®. When impregnated with a hardening polymeric resin a plate or mat of such material obtains a 3-dimensional structure of closed outer walls of glass fiber-reinforced resin separated by a generally open structure with erect filaments connecting the opposite walls. When locally pressed together prior to and during setting of the resin, the walls may fuse during their formation and provide laterally closed segments. The structure as a whole can be formed as well, e.g. to conform to a curvature of the object ensuring good mechanical and/or thermal contact. Thus, a structure with a predetermined pattern of enclosed channels may be provided, which may be quite intricate if so desired and which may stand pressures of 1-8 bar overpressure.

As an alternative technique, a thermoplastic open-pore web or foam may be deformed with one or more hot elements locally melting the material together. Thus, channels and other structures may be provided in the material.

The disclosure is not restricted to the above described embodiments which can be varied in a number of ways within the scope of the claims. For instance a tubular segment can have a non-circular cross sectional shape which may vary in shape and/or size, e.g. being conical and/or changing from pentagonal or hexagonal to round along the tubular direction. A funnel-shape could also be realised. Fortifications as disclosed herein may be applied to provide distinct shape accents in other wound objects, e.g. curved objects or generally objects comprising a first wall segment, being convex, and a second wall segment, being convex, are connected to each other generally at a nonzero angle by a filleted joint, thus forming a 2 or 3-dimensionally convex curved shape producible by winding over a suitably shaped and locally fortified mandrel. The radius of curvature of the fillet could be less than about ⅕ of a radius of curvature of the first wall segment and the second wall segment adjacent the joint. The fortification could be formed as a ring-shaped object with adjustable circumferential shape and/or size, e.g. a strip, rod or tube bent around and comprising a screwing and/or resilient section between two portions to adjust the circumferential size of the thus formed shape.

A container made according to the disclosures could be used for water, liquid or granular human or animal foodstuffs, e.g. for transport of grains or flour or a silo for food pellets, but also for mineral oils such as fuel oils, chemicals, and/or gases, in particular liquefied gases, uses possibly depending on a suitable liner.

Elements and aspects discussed for or in relation with a particular embodiment may be suitably combined with elements and aspects of other embodiments, unless explicitly stated otherwise.

The invention claimed is:

1. A method of manufacturing a wrapped object comprising a first tubular segment and a second end segment connected to each other by a curved transition segment having a first common tangent with the first tubular segment and a second common tangent with the second end segment, respectively, the first and second common tangents extending in a common plane, wherein the method comprises:

provide a mandrel with a surface structure to define at least part of the shape of the first tubular segment, of the shape of the second end segment and of the shape of the curved transition segment in between; and wrapping one or more elongate elements over the mandrel and bonding the one or more elongate elements to itself and/or each other so as to provide the first tubular segment, the second end segment and the curved transition segment as a continuous structure, wherein the mandrel has a shape corresponding to the shapes of the first tubular segment, the second end segment and the curved transition segment, and comprises an inflatable portion defining at least part of the shape of the first tubular segment and is provided with a fortification at least at the position of the curved transition segment, wherein the fortification extends over part of the first tubular segment defining a rim extending around an axis defining a shape of the curved transition segment and is configured to support the one or more elongate elements forming the curved transition segment against inward-directed forces, with respect to a direction of curvature of the curved transition segment in the common plane, while wrapping and/or bonding the one or more elongate elements to form the curved transition segment.

2. The method of claim 1, wherein the wrapped object is a container.

3. The method of claim 1, wherein the mandrel comprises a dissolvable portion.

4. The method of claim 1, wherein the fortification comprises one or more rigid bodies to support at least part of the transition segment.

5. The method of claim 1, wherein the fortification comprises one or more pressurizable bodies.

6. The method of claim 1, comprising providing the first tubular segment and/or the second end segment with a liner, which may be formed from one or more inflatable portions of an inflatable mandrel.

7. The method of claim 1, wherein the bonding is done with an adhesive or binder, e.g. wherein the one or more elongate elements comprise an inorganic or organic fiber and/or tape which may be bonded together with a thermoplastic polymer composition or adhesive.

8. The method of claim 1, wherein the wrapped object is formed as a generally rigid and/or self-supporting body.

9. The method of claim 1, comprising:
providing one or more portions of a cellular material onto at least one of the first tubular segment and the second end segment,
providing one or more further wall segments onto the one or more portions of a cellular material and separated from a wall of the first tubular segment and a wall of the second end segment respectively, thus providing the object with a double-walled construction with one or more intervening spaces between the first tubular segment and/or the second end segment and the one or more further wall segments and the one or more portions of a cellular material, respectively, and
filling the one or more intervening spaces with one or more further cellular materials such as foams.

10. The method of claim 9, further comprising wherein at least one of the first and second wall segments, and/or the one or more cellular materials and/or foam portions in at least a portion of an intervening space are bonded to the respective further wall segments that are opposite each other and define that portion of the intervening space to each other.

11. The method of claim 1, wherein the method comprises providing a heat exchanger in or in close thermal contact with at least one wall of the object, wherein the heat exchanger may comprise a fiber plate structure and/or be integrated into at least one of the first tubular segment and the second end segment.

12. The method of claim 11, comprising:
forming the heat exchanger by deformation of a substantially hollow fiber plate or fiber mat and fixing the thus deformed fiber plate or mat in the deformed state, e.g. by impregnating the plate of mat with a hardening matrix material to define one or more fluid channels through the thus fixed fiber plate or mat.

13. The method of claim 11, wherein the heat exchanger comprises a plate-like body having a channel for a heat exchanger fluid, the plate-like body conforming to at least one of the first tubular segment and the second end segment, wherein e.g. the plate-like body is accommodated in the mandrel and/or is part of the mandrel.

14. A mandrel for use in the method of claim 1, wherein the mandrel is a multi-part mandrel.

15. A wrapped object manufactured according to claim 1, being a hollow wound object.

16. The method of claim 4, wherein plural rigid bodies are interconnected with each other directly and/or via a supporting structure.

17. The method of claim 4, wherein plural rigid bodies are interconnected with each other via a supporting structure.

18. The method of claim 5, wherein the fortification comprises one or more inflatable chambers connected to another inflatable portion of the mandrel.

19. The method of claim 2, wherein the first tubular segment of the container forms a generally elongated body and end segments are provided on opposite ends of the first tubular segment closing the tubular segment.

20. The method of claim 8, wherein at least part of the mandrel is deformed and removed from the rigid and/or self-supporting body through an opening provided in the object, and wherein the object may be a substantially closed shell.

* * * * *